United States Patent
Mossman et al.

(10) Patent No.: US 7,822,493 B2
(45) Date of Patent: Oct. 26, 2010

(54) CONTROL SYSTEM ACTUATION FAULT MONITORING

(75) Inventors: David C. Mossman, Gilbert, AZ (US); Russell J. Enns, Chandler, AR (US); Jonathan B. Dahman, Gilbert, AZ (US)

(73) Assignee: The Boeing Company, Chicago, IL (US)

(*) Notice: Subject to any disclaimer, the term of this patent is extended or adjusted under 35 U.S.C. 154(b) by 362 days.

(21) Appl. No.: 11/969,150

(22) Filed: Jan. 3, 2008

(65) Prior Publication Data

US 2009/0177292 A1 Jul. 9, 2009

(51) Int. Cl.
*G05B 13/02* (2006.01)
*G05B 9/02* (2006.01)
*G01C 23/00* (2006.01)

(52) U.S. Cl. .............. 700/29; 700/33; 700/54; 700/79; 701/3

(58) Field of Classification Search .......... 700/21, 700/29, 30, 33, 34, 35, 54, 79; 701/3, 4, 701/11, 12, 14
See application file for complete search history.

(56) References Cited

U.S. PATENT DOCUMENTS

| | | | |
|---|---|---|---|
| 6,561,463 B1 * | 5/2003 | Yount et al. | 244/196 |
| 2004/0107013 A1 * | 6/2004 | Fuller et al. | 700/53 |

OTHER PUBLICATIONS

Osder, Stephen, "Practical View of Redundancy Management Application and Theory", Journal of Guidance, Control and Dynamics, Jan.-Feb. 1999, pp. 12-21, vol. 22.

* cited by examiner

*Primary Examiner*—Ryan A Jarrett
(74) *Attorney, Agent, or Firm*—Haynes and Boone, LLP.

(57) ABSTRACT

Methods and apparatus for monitoring and detecting failures in the actuation of a control system, such as a flight control system for an aircraft, include defining a nominal model of the control system in terms of the state variables of the control system, defining a model of an asymmetric "actuation monitoring envelope" that dynamically bounds a range that measured state variables of the system are allowed to take during operation of the system as a function of the nominal system state model, monitoring a signal corresponding to a state variable of the system during operation thereof, and detecting a failure in the actuation of the control system when the monitored signal exceeds the bounds of the monitoring envelope.

20 Claims, 16 Drawing Sheets

CONTROL SYSTEM ACTUATION FAULT MONITORING

BACKGROUND

This disclosure relates to automatic control systems in general, and in particular, to methods and apparatus for monitoring the actuation of control systems and the rapid detection of failures occurring therein.

Control systems are used for a myriad of applications, including manufacturing, transportation and energy production. Failures of a control system affect the performance, and often, the safety of the system if not detected and handled properly. In fact, an undetected failure can result in undesirable consequences. Thus, it is crucial to detect failures and reconfigure the system to adapt to such failures.

In the case of developing improved flight control systems for aircraft, for example., helicopters, robust, reliable failure detection is a requisite for the architectures. Typically, single channel electrical control may be used, but if a failure is detected in a subsystem, the flight control system must then be capable of disengaging the electrical control system and reverting to an underlying mechanical flight control system.

Failures in control systems can be classified into three categories, viz., "front end" (i.e., sensor-related), "middle" (i.e., processing-related) and "back end" (i.e., actuation-related). In the last of these, the term "actuation" is used rather than "actuator," because the failure detection technique must detect failures occurring not only in the actuators themselves, but also in the commanding of the actuators.

Over the last several decades, control system failure detection and isolation have been well researched, and many failure detection techniques have been developed for each of the above categories, although most of these relate to front end (i.e., sensor) failure detection. The methods developed have also been applied in a wide variety of applications of varying criticality, such as flight controls, semiconductor manufacturing and nuclear power systems, and generally speaking.

Examples of failure detection and isolation methods include:
1) physical redundancy;
2) analytic redundancy; and,
3) statistical methods, such as the "Generalized Likelihood Ratio Test" (GLRT) and the "Sequential Probability Ratio Test" (SPRT).

A thorough overview of the techniques and issues involved with both physical and analytic redundancy management is provided in Osder, S., "Practical View of Redundancy Management Application and Theory," *AIAA Journal of Guidance, Control and Dynamics*, Vol. 22, No. 1, January-February 1999, pp. 12-21.

Physical redundancy methods require additional hardware, which increases cost, and present other difficulties when used for actuation monitoring. Analytic redundancy usually requires large tolerances because of the uncertainty in the physical relationships being exploited to provide the solution. Statistical methods do not take into account the known physics of the problem. Most methods used in practice typically compare the outputs of the actual system to those of a nominal model of the system and compute the error (residual) between the system and the model. When the residual goes above a fixed tolerance, the system is deemed to have failed. However, when using fixed tolerances, the tolerances chosen must account for the worst case condition, making the tolerance/envelope much larger than is practical or efficient in many applications.

Accordingly, methods and apparatus are needed for the monitoring and rapid detection of failures occurring in the "back end," i.e., the actuation, of a control system that overcome the above problems of the actuation failure detection and isolation techniques of the prior art.

SUMMARY

In accordance with the exemplary embodiments disclosed herein, novel systems are provided for the failure monitoring of the actuation, i.e., the back end, of a control system. These monitoring systems are capable of detecting a failure rapidly and enable reconfiguration before the system state changes substantially, thereby preventing damage or loss of the system. In contrast to the methods and apparatus of the prior art, which have been developed for very specific applications, the techniques disclosed herein provide a general framework that can be applied to any system requiring actuation monitoring.

In accordance with one exemplary embodiment, a method for monitoring and detecting failures in the actuation of a control system comprises: defining a nominal model of the control system in terms of the state variables of the control system; defining a model of an asymmetric actuation monitoring envelope that dynamically bounds a range that measured state variables of the system are allowed to take during operation of the system as a function of the nominal system state model; monitoring a signal corresponding to a state variable of the system during operation thereof; and, detecting a failure in the actuation of the control system when the monitored signal exceeds the bounds of the monitoring envelope.

In another exemplary embodiment, an apparatus for monitoring and detecting failures in the actuation of a control system comprises a nominal model of the control system defined in terms of the state variables of the control system; a model of an asymmetric actuation monitoring envelope that dynamically bounds a range that measured state variables of the system are allowed to take during operation of the system defined as a function of the nominal system state model; means for monitoring a signal corresponding to a state variable of the system during operation thereof; and, means for detecting a failure in the actuation of the control system when the monitored signal exceeds the bounds of the monitoring envelope.

A better understanding of the above and many other features and advantages of the control system actuation failure monitoring systems of the present disclosure can be obtained from a consideration of the detailed description of some exemplary embodiments thereof below, particular if such consideration is made in conjunction with the appended drawings, wherein like reference numbers are used to refer to like elements in the respective figures thereof.

DETAILED DESCRIPTION

In accordance with the present disclosure, novel dynamic system integrity and fault monitoring systems are provided that are capable of detecting actuation related failures in control systems. The monitoring systems are operative to create a dynamic, asymmetric "monitoring envelope" of the monitored control system that accounts for the permissible variations in the system's dynamics and non-linearities. A failure of the actuation of the control system is then indicated if and when a monitored signal exceeds the bounds of that envelope. The explicit accounting for dynamics and non-linearities, including any variations therein, in the monitoring systems of the present disclosure is in contrast to existing monitoring systems. As such, the monitoring systems of the present disclosure are more robust, enabling quicker and more reliable failure detection. This is critical for control systems in which timely shutoff is crucial. The monitoring systems of the present disclosure are thus ideally suited for any such applications, including the shutting down of fail-passive systems.

The particular exemplary embodiments described herein are discussed and illustrated in the context of two exemplary flight control architectures for a helicopter. In both cases, the candidate architectures are for the main and tail rotor actuation systems of that aircraft, respectively, and require the quick, reliable detection of failures occurring therein for both performance and safety reasons. The first architecture considered is a full "fly-by-wire" (FBW) system with mechanical backup, whereas the second is a "fail-passive," 20% "partial authority" system. The application of the monitoring systems disclosed herein to these particular architectures provides control systems with quick and reliable detection of actuation failures occurring therein, thereby allowing for rapid, automatic switchover to backup systems before a loss of control occurs.

However, although the novel monitoring systems disclosed herein are presented in the context of specific applications, as those of skill in this art will readily appreciate, these techniques can also be applied to many other physical models wherein rapid, reliable detection of control failures is desired, for example, economic systems, medical systems, manufacturing process controls, and many others. The monitoring systems described herein enable any arbitrary system to be monitored. As will be seen below, the monitored system can comprise any number of series or parallel subsystems, cascaded together in any fashion desired.

Figure 1:
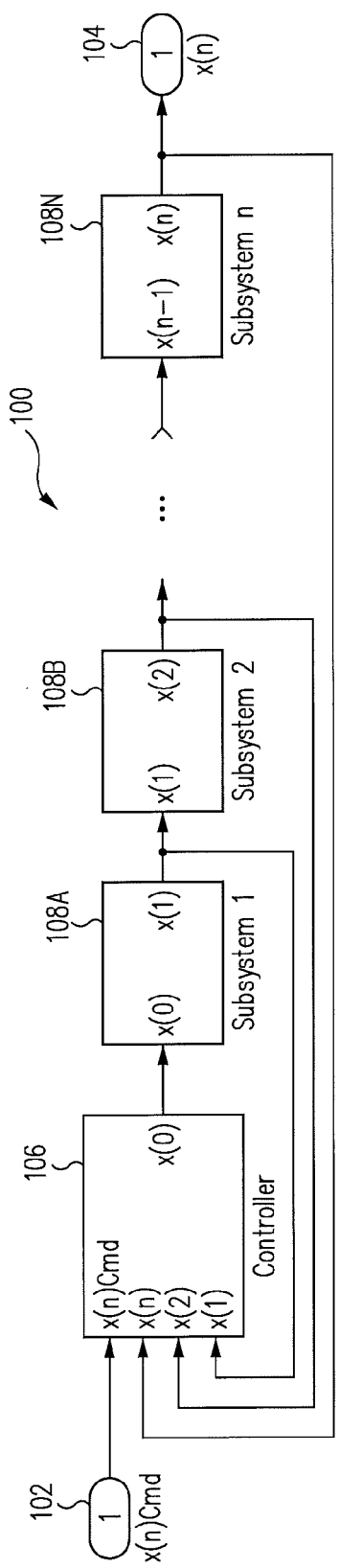
FIG. 1 is a functional block diagram of an exemplary n-stage control system, comprising n series-cascaded, single-input, single-output (SISO) subsystems, to which the actuation failure monitoring systems of the present disclosure have advantageous application.

FIG. 1 illustrates one common type of control system 100 to which the actuation monitoring systems of this disclosure are applicable, viz., an n-stage control system, comprising a command input 102, a command signal output 104, a controller 106, and n series-cascaded, single-input, single-output (SISO) subsystems 108A . . . 108N. Each subsystem 108($i$) may have any arbitrary form, including any number of non-linearities (such as rate or position limits, dead zones, and the like), such as the one illustrated in FIG. 2.

Figure 2:
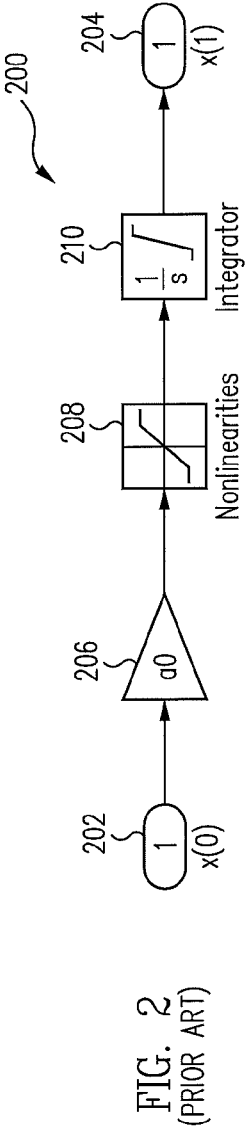
FIG. 2 is functional block diagram of an exemplary stage, or SISO subsystem, of the control system of FIG. 1.

FIG. 2 illustrates a typical and fairly simple subsystem 200 of a type that might be present in the n-stage control system 100 of FIG. 1, and comprises a command input 202, a control signal output 204, an amplifier 206, a sub-system non-linearity 208, and an integrator 210.

Figure 3:
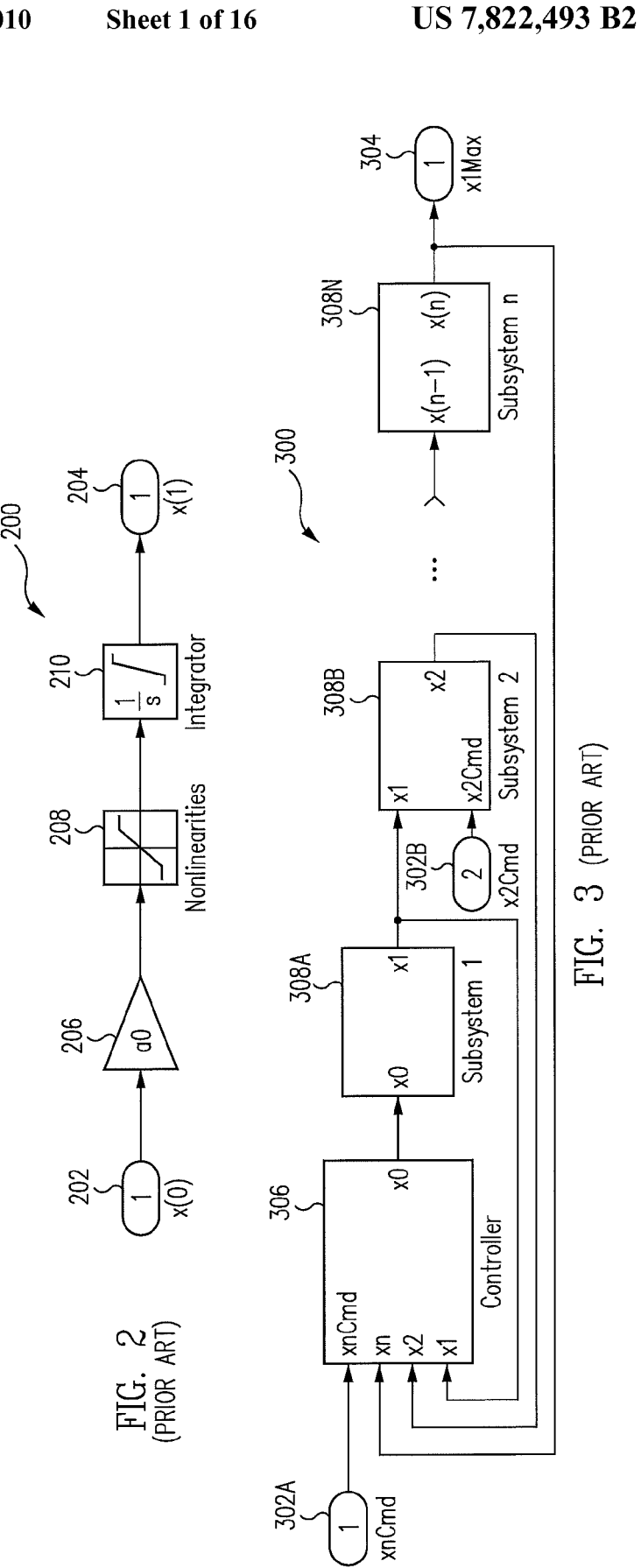
FIG. 3 is a functional block diagram of an exemplary non-SISO control system to which the actuation monitoring systems of the present disclosure have application.

An example of another type of control system to which the monitoring systems described herein have advantageous application is illustrated in FIG. 3, and comprises a non-SISO control system 300. The control system 300 includes multiple command signal inputs 302A, 302B, a single command signal output 304, a controller 306 and a plurality of non-SISO subsystems 308A . . . 308N. An example of the application of the actuation monitoring systems of this disclosure to this form of control system is described in more detail below.

In both of the respective control systems 100 and 300 of FIGS. 1 and 3, a controller 106 or 306 provides the appropriate feedback loop closures required to obtain the desired system performance. This disclosure does not address the design of such controllers.

Dynamic Asymmetric System Fault Monitoring

General Concept as Applied to a Generalized Control System

The Dynamic Asymmetric System Fault Monitoring systems of the present disclosure comprise defining a "monitoring envelope" that dynamically bounds the allowable range of the actual measured system state variables as a function of the nominal system state model. The systems incorporate two "subsystems" of the monitored system, both of which are variants of the nominal model. One subsystem defines the upper bounds of the monitoring envelope and the other subsystem defines the lower bounds of the monitoring envelope.

The models incorporate all of the linear and non-linear characteristics of the monitored system (e.g., gains, limits, dead zones, and the like), including the characteristics of the sensors thereof. Each characteristic of the monitored system has a defined range and/or tolerance. As examples, an open loop gain has a range, specified by minimum and maximum values, whereas, sensors have scale factors and offset tolerances associated with them that are representative of the behavior of the sensor. The monitoring systems of this disclosure all contemplate that each functionally significant element of the control system has variations and/or tolerances that are characterized and/or specified and accounted for in the system models.

As those of skill in the art will appreciate, once the characteristics "models" of the control and systems have been finally characterized and/specified to the degree desired, the monitoring systems are amenable to implementation in silicon, e.g., in programmable gate arrays (PGAs), including field-programmable gate arrays (FPGAs) that enable changes in the software or firmware to be made in the field.

Figure 4:
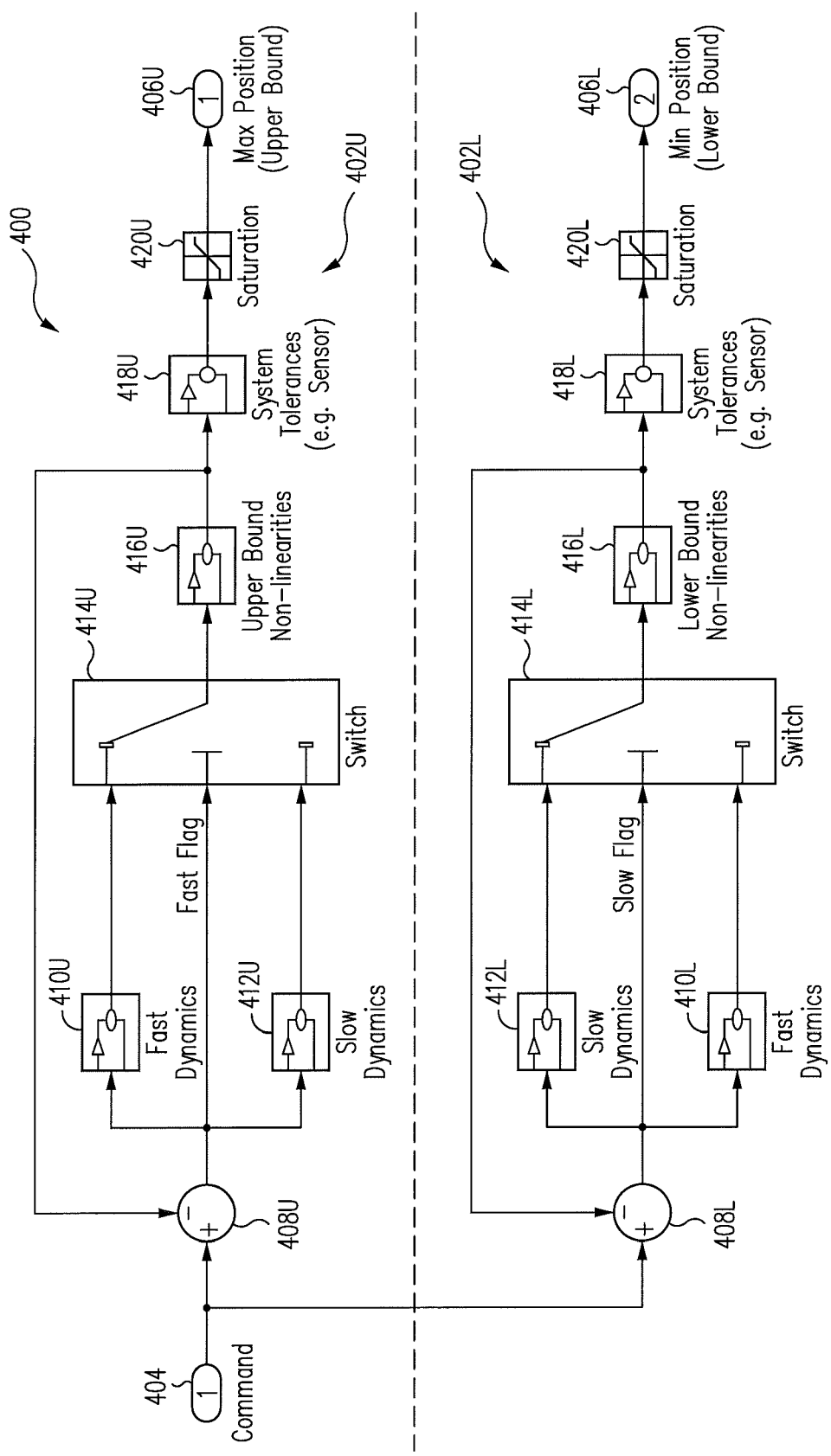
FIG. 4 is a functional block diagram of an exemplary embodiment of an actuation failure monitoring system in accordance with the present disclosure, as applicable to a first order control system.

The exemplary actuation fault monitoring systems hereof, such as the one illustrated in FIG. 4, are first developed for a first order control system. The monitoring systems are then extended to control systems of arbitrary dimension and complexity. FIG. 4 is a functional block diagram of an exemplary embodiment of a fault monitoring envelope model 400 in accordance with the present disclosure that is useful in monitoring first order control systems.

The upper portion of the block diagram of the envelope model 400 illustrates a first "subsystem" 402U that is used for defining the upper bound of the system monitoring envelope, and the lower part of the diagram illustrates a second subsystem 402L used for the lower bound of the monitoring envelope. The exemplary monitoring envelope model 400 comprises a command signal input 404 and maximum and minimum position (i.e., upper bound and lower bound) signal outputs 406U and 406L, respectively. The subsystems 402U and 402L each further comprises a respective system feedback loop closure which, in this exemplary embodiment, respectively comprise command/feedback signal summers 408U and 408L, respective fast and a slow system dynamics models 410U and 410L and 412U and 412L, respective switches 414U and 414L (described in more detail below), system upper and lower bound nonlinearity models 416U and 416L, system lumped tolerances models 418U and 418L, and system saturation models 420U and 420L. In both subsystems 402U and 402L, all of the elements are implemented in discrete-time, reflective of the digital nature of all of the exemplary monitoring systems described herein. Thus, the system models herein necessarily incorporate appropriate continuous-time-to-discrete-time conversion mechanisms.

In order to provide the upper and lower bounds of the system state variables monitoring envelope, the respective system dynamics and non-linearity models 410, 412 and 416 are selectively switched by the respective switches 414 U and 414L of the subsystems to reflect the maximum permissible envelope based on variations in those two parameters during operation. Thus, when a command is in the direction of a bound, the values used for the dynamics and non-linearities in the subsystem that determines that bound are those that cause the greatest separation from the command (and hence, the nominal model), thereby ensuring the largest possible separation between the nominal model and that bound. In the case of the system dynamics, it uses the fastest permissible dynamics. Similarly, the bound that the command (and hence, the nominal model) is moving away from uses values for its model that cause the largest separation between it and the nominal model. In the case of the system dynamics, it uses the slowest permissible dynamics.

Thus, as a command changes and moves towards one bound or the other, the model parameters used for determining those bounds are selectively switched between by the switches 414. Doing so provides asymmetric tolerances that allow for variations in the actual system dynamics, while at the same time, allowing for system dynamics that would otherwise cause "nuisance trips" in a monitoring system that lacks such dynamic monitoring.

Figure 5:
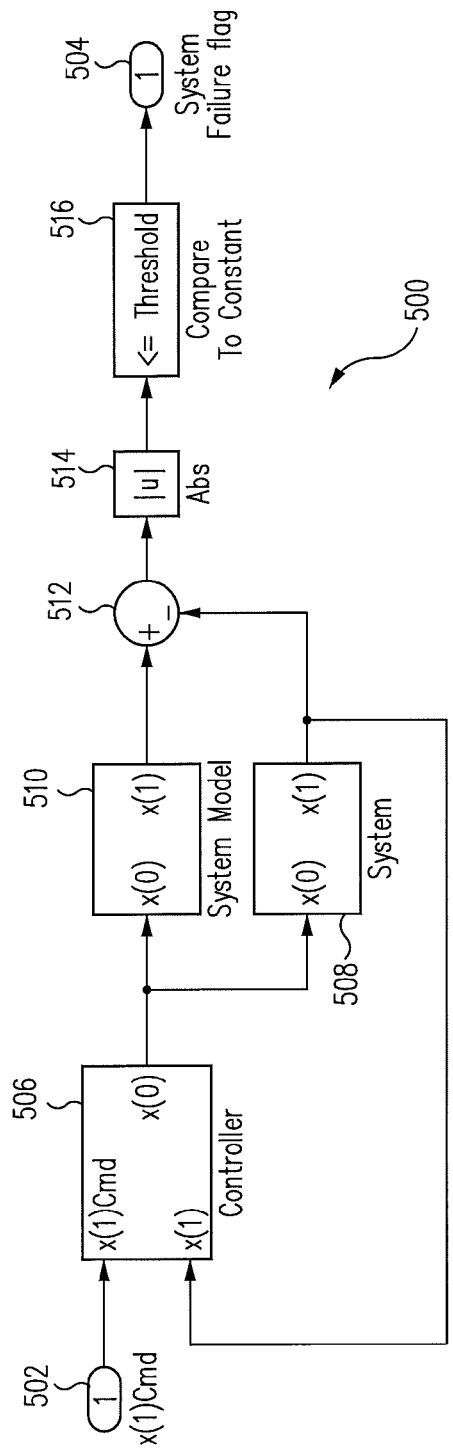
FIG. 5 is a functional block diagram of a prior art actuation fault monitoring system in which actuator response is modeled open-loop.

As illustrated in FIG. 4, the monitoring system 400 incorporates a system feedback loop closure in the monitoring process. This is in contrast with many conventional (non-statistical) actuation fault monitoring techniques in which the actuator response is modeled "open-loop," such as the conventional monitoring system 500 illustrated in FIG. 5, comprising a command input 502, a system failure flag output 504, a system controller 506, a monitored control system 508, a nominal model 510 of the monitored system, a signal summer 512, a signal magnitude generator 514 and a comparator 516. By contrast, the loop closure of the present method guarantees the stability of the envelope, since the system is presumed to be designed to be stable for all possible variations in system behavior.

Need for Loop Closure Delay on the Envelope's "Slow Side"

Figure 6:
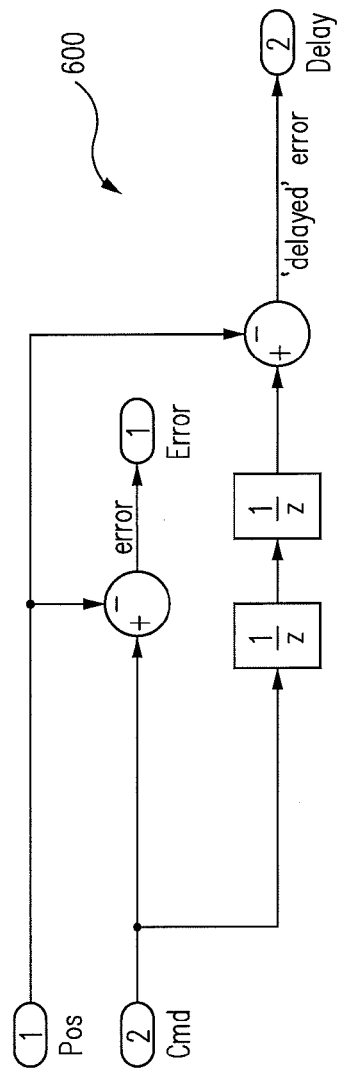
FIG. 6 is a functional block diagram of an exemplary system for obtaining a delay of two samples of a low side command signal in accordance with the present disclosure.
Figure 7:
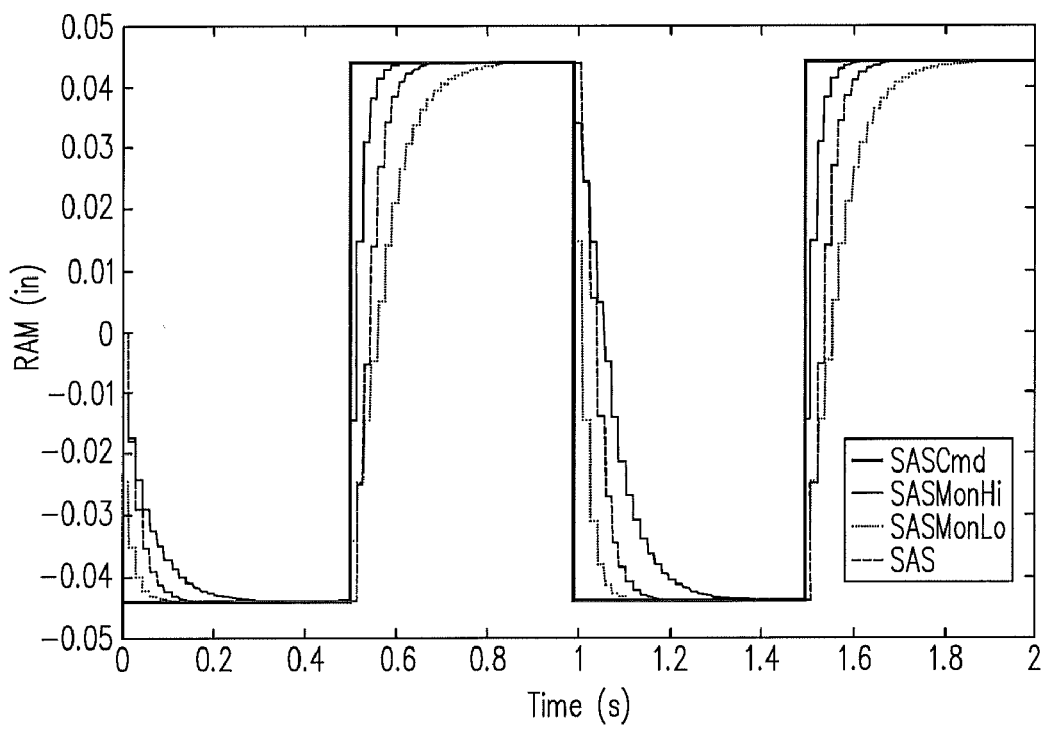
FIGS. 7 and 8 are graphs respectively illustrating the responses of an actuation monitoring system in accordance with the present disclosure with and without low side signal delay.
Figure 8:
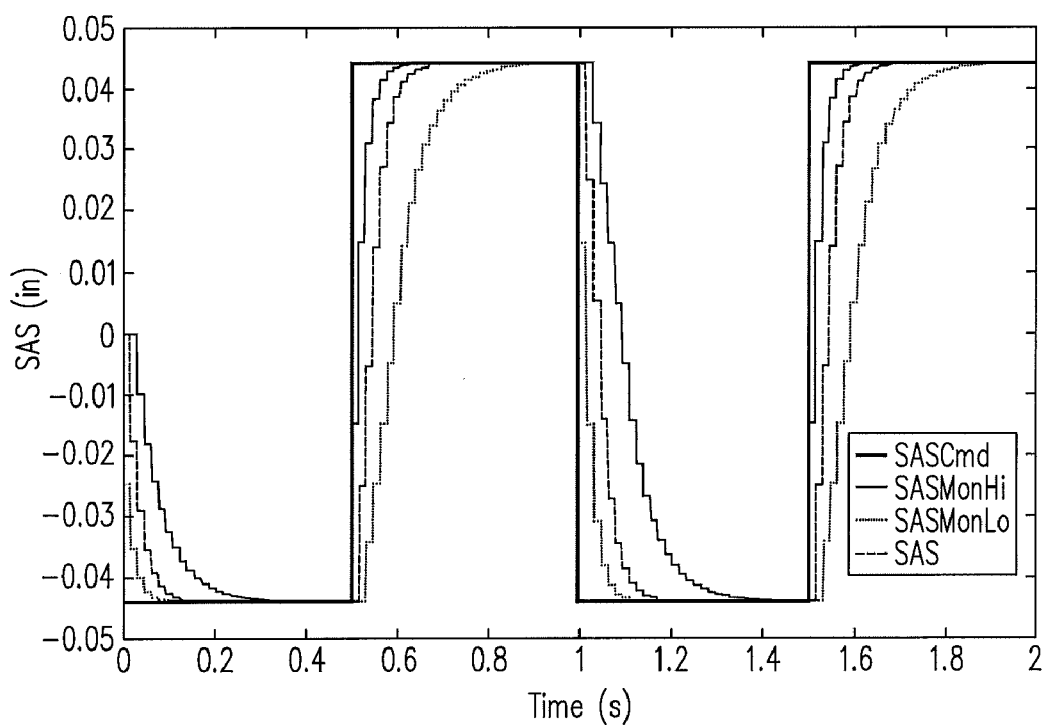

It has been discovered that a key to obtaining dynamic separation between the envelope and the signal is to delay the modeled loop closure on the "slow side" of the envelope 400 (i.e., the lower bound on a rising signal, the upper bound on a falling signal). A delay of two samples of the command, obtained as illustrated in FIG. 6, is needed in the loop closure mechanism to provide the required signal-envelope separation. The desirability of such a delay is illustrated in FIGS. 7 and 8, which respectively illustrate monitoring envelope models for a Stability Augmentation System (SAS) described in more detail below, with and without the above "slow side" signal delay. As may be seen in FIG. 7, without the slow side delay, the monitored signal, "SAS," falls outside of the respective upper and lower boundaries, "SASMonHI" and "SASMonLo," of the monitoring envelope at times T≈0, 0.5, 1 and 1.5 seconds, respectively, whereas, in FIG. 8, the monitored signal remains within the bounds of the monitoring envelope at all times. The necessity for the delay is thus quite clear from the figures. It should be noted that, in order to highlight the need for the slow side delay, FIGS. 7 and 8 show models that do not include the system tolerances that also contribute to a complete definition of the monitoring envelope.

Extension to Systems of Arbitrary Form and Dimension

Figure 9:
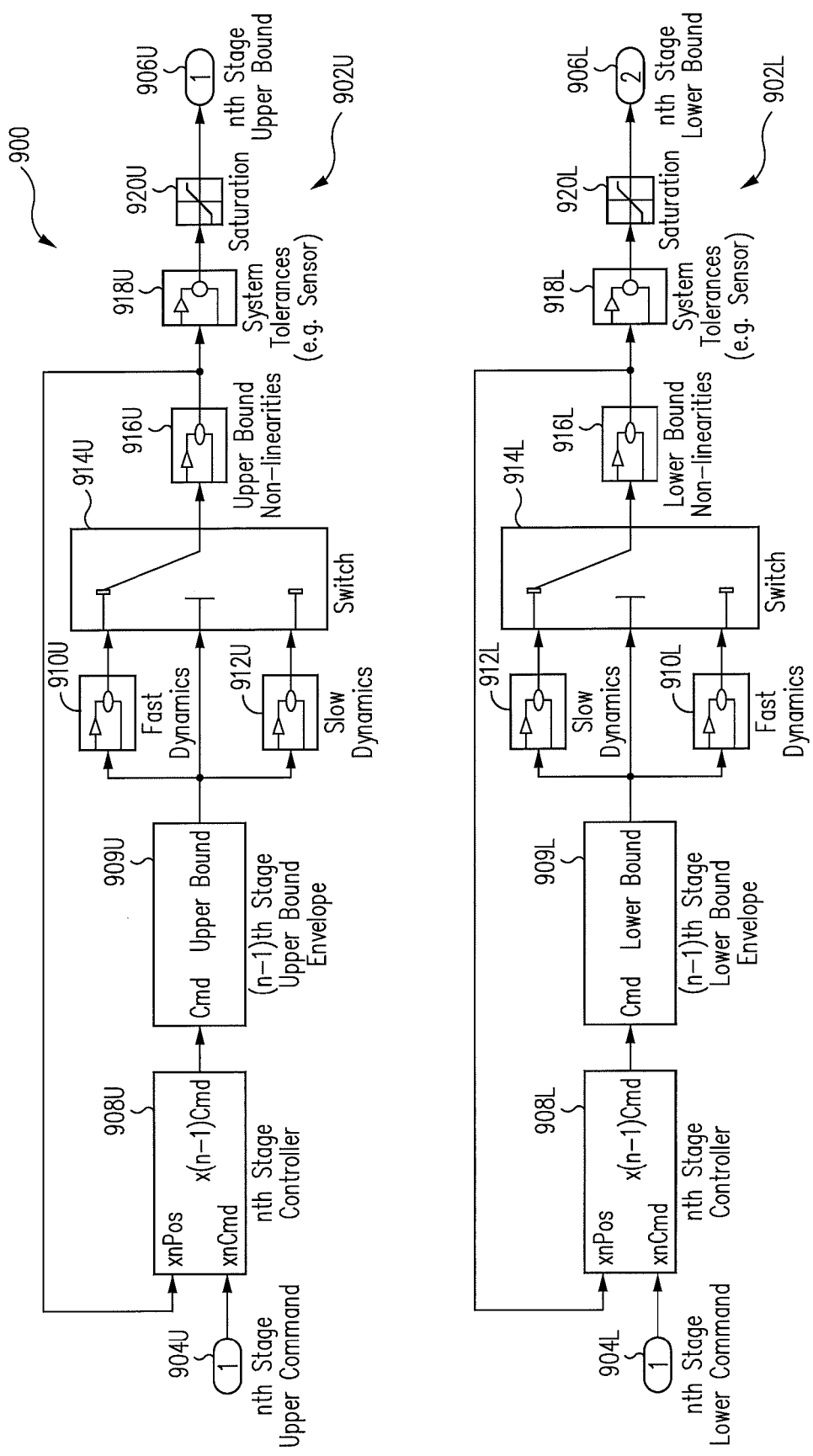
FIG. 9 is a functional block diagram of an exemplary embodiment of an actuation monitoring system in accordance with the present disclosure, as applicable to one stage of an nth order, series-cascaded-stage SISO control system.

As discussed above, the monitoring systems of the present disclosure can be applied to any dimension control system of any arbitrary form. For example, FIG. 9 illustrates an exemplary embodiment of an actuation monitoring system 900 for a stage n of an nth order SISO control system comprising n, series-cascaded subsystems, such as the control system 100 of FIG. 1. An alternative embodiment of the monitoring system that is useful for parallel subsystems is described and illustrated in more detail below.

In FIG. 9, the elements of the monitoring system envelope model 900 for each stage of the n-stage control system are substantially the same as those described in the embodiment 400 of FIG. 4, with the exception that nth stage controllers 908U and 908L and nth stage upper and lower bound envelopes 909U and 909L take the respective places of the command/feedback signal summers 408U and 408L of the former model.

Failure Declarations

Two approaches can be used to declare a failure in the actuation of a control system. In one approach, a failure is declared if any of the bounds of the monitoring envelope is exceeded. A second, more robust method is to use a "time-and-magnitude" monitoring technique. This pre-vents both very short-duration failures and very marginal failures (e.g., negligible failures due to noise or other un-modeled effects) from resulting in a declaration of a system failure. Instead, a more sustained discrepancy can be required for the declaration of a failure, the length of time that the discrepancy needs to be sustained being a function of the magnitude of the amount that the monitored signal exceeds the bounds of the monitoring envelope.

Application to Exemplary Helicopter Actuation System Fault Monitoring

The Dynamic Asymmetric Actuation Fault Monitoring systems of the present disclosure are described below in the context of two specific helicopter flight control applications. In the first application, the monitoring system is applied to the actuation monitoring of a flight control system architecture comprising a full-authority, fly-by-wire (FBW) system with mechanical backup. In the second application, the technique is applied to the actuation monitoring of an architecture comprising a fail-passive, 20% partial authority system. In both examples, the purpose is to monitor the respective health of the helicopter main rotor and tail rotor actuations. The monitoring systems of the present disclosure provide quick and reliable detection of actuation failures in both of these systems, allowing for automatic switchover to the back up systems before loss of control occurs.

In the following description, the actuators are first described and respective models thereof are presented. Then, the application of the monitoring systems of the present disclosure to the two examples is described.

Helicopter Rotor Actuation Example

The exemplary helicopter includes three main rotor actuators and one tail rotor actuator. All of the actuators are very similar in nature, each being an electro-hydraulic actuator that is controlled by both a control "stick" (via a mechanical linkage) and a Flight Management Computer (FMC) (via electrical control). In the normal mode of operation of the helicopter's control system, the stick has 100% authority, and a "Stability Augmentation System" (SAS) of the FMC has a +10 to −10% authority (20% in one direction of the pitch axis).

Each actuator also has a fly-by-wire (FBW) mode (used as a backup control system (BUCS) of the aircraft), which is operative to remove the mechanical authority and make the SAS full authority (i.e., 100%). This is done by engaging a plunger, which has the effect of setting a linkage gain $K_1$ (described below) to 0.

Figure 10:
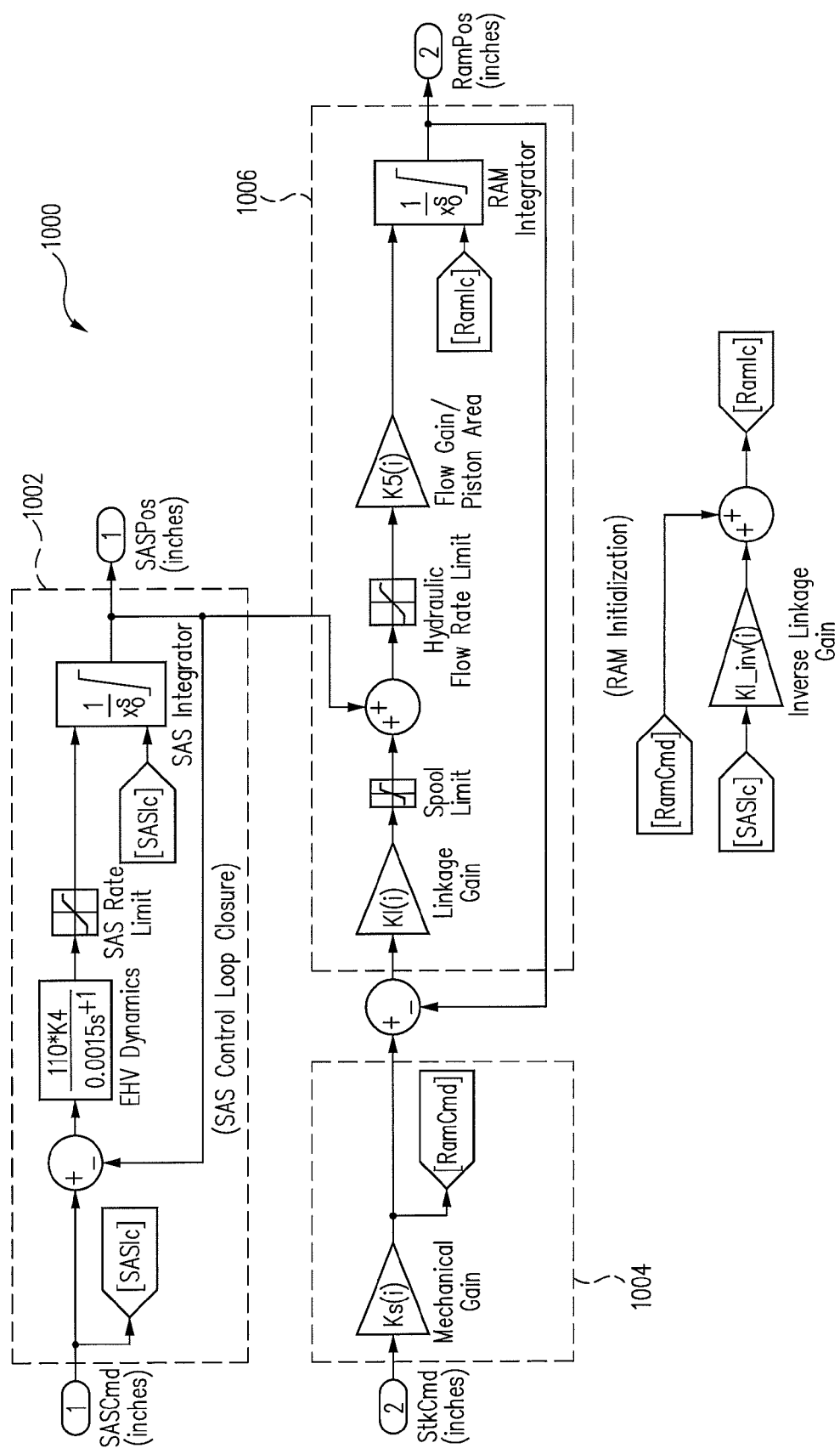
FIG. 10 is a functional block diagram of a model of an exemplary helicopter actuator.

FIG. 10 is a functional block diagram, or system model 1000, of the basic actuator control system, which may be substantially the same for all of the actuators considered herein. Indeed, the only differences between the respective actuator models are the constants summarized in Table 1 below, which is a listing of the constants used in the respective actuator models. In Table 1 and FIG. 10, "SAS" stands for "stability augmentation system," "K" represents a gain of an element, e.g., linkage gain "$K_1$," "EHV" stands for "electro-hydraulic valve," "CMD" stands for command, "ic" stands for "initial condition," "ram" refers to the hydraulic ram, or piston, of the actuator, "pos" stands for "position," "in" for "inches," "Stk" stands for the "control stick," "lim" stands for "limit" and "inv" stands for "inverse of." It may be noted in Table 1, for example, that the hydraulic flow rate limit is (ram rate lim)/K5. With reference to FIG. 10, the common actuator model 1000 includes SAS dynamics 1002, ram dynamics 1004, and other mechanical limitations 1006, e.g., linkage limitations.

TABLE 1

Actuator Constants

| Variable | | Axis | | | |
|---|---|---|---|---|---|
| Gains | Units | Pitch | Roll | Collective | Yaw |
| $K_s$ | in ram/in stick | 0.35 | 0.39 | 0.29 | 0.32 |
| $K_1$ | in spool/in ram | 0.125 | 0.25 | 0.25 | 0.25 |
| $K_5$ | in ram/s/in spool | 235.0 | 120.0 | 120.0 | 60.0 |
| $K_{EHV\,CMD}$ | (mA/in SAS | 110.0 | 110.0 | 110.0 | 110.0 |
| $K_4$ | in SAS/s/mA | 0.3137 | 0.3137 | 0.3137 | 0.3137 |
| | Limits | | | | |
| Spool lim | in spool | ±0.1118 | ±0.1118 | ±0.1118 | ±0.1175 |
| SAS rate lim | in SAS/s | 1.2548 | 1.2548 | 1.2548 | 1.2548 |
| SAS pos lim | in ram/s | +0.088/0.044 | ±0.088 | ±0.088 | ±0.044 |
| Ram rate lim | in ram/s | 3.5 | 3.5 | 3.5 | 1.75 |
| Ram pos lim | in ram | ±1.75 | ±1.75 | ±1.75 | −0.875/0.689 |

For the second exemplary application, i.e., the 20% authority partial authority flight control system, the actuators are modified to have a 20% authority. This is manifested in the actuator models by changing $K_1$ and $K_5$ in the roll and collective axes equal to that of pitch ($K_1$=0.125 and $K_5$=235 respectively), and increasing the respective pitch and yaw axes SAS position limits to ±0.088 inches.

Actuator Model Tolerances/Variations

Figure 11A:
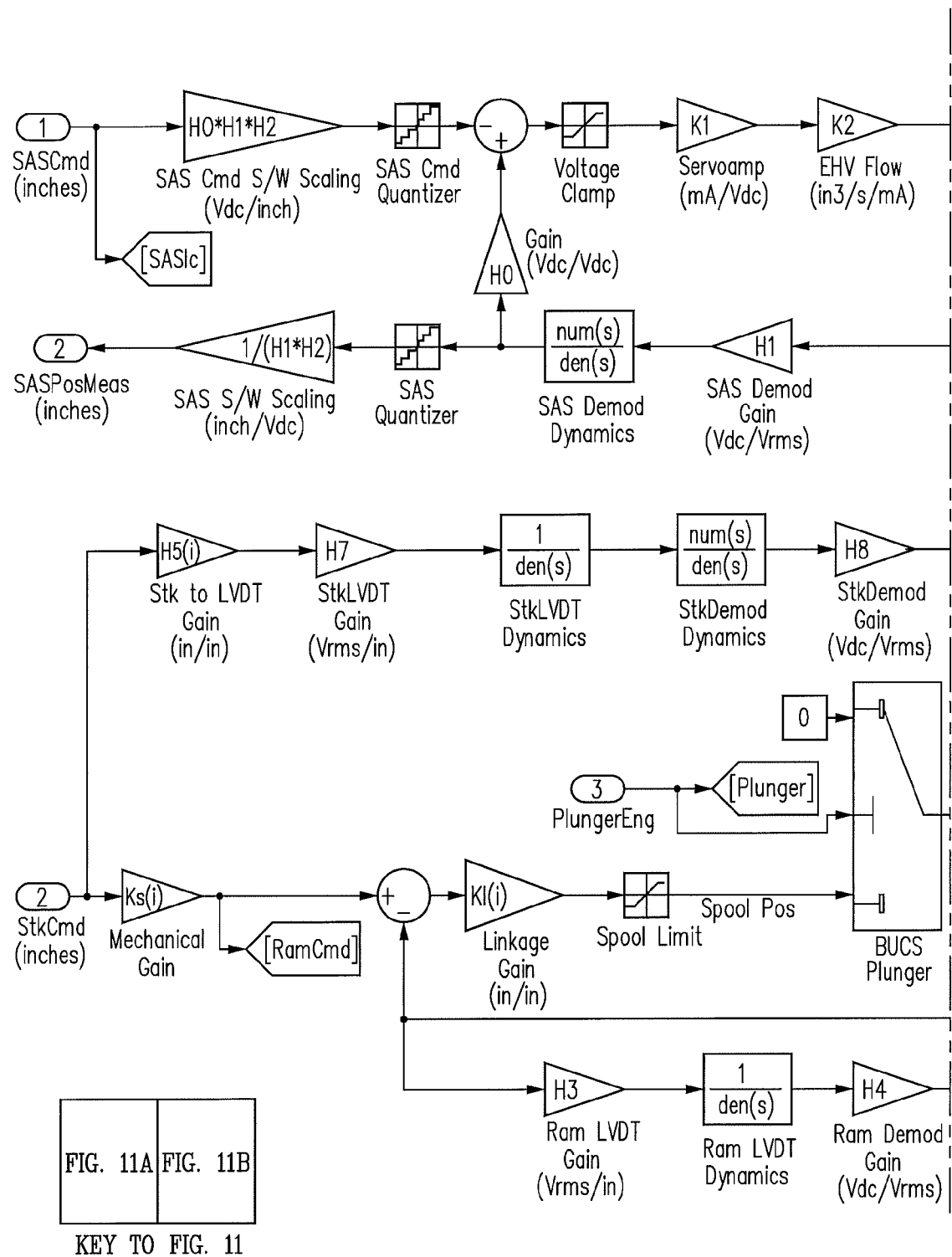
FIG. 11 is a more detailed functional block diagram of the helicopter actuator model of FIG. 10, taking into account actuator parameter tolerance variations.
Figure 11B:
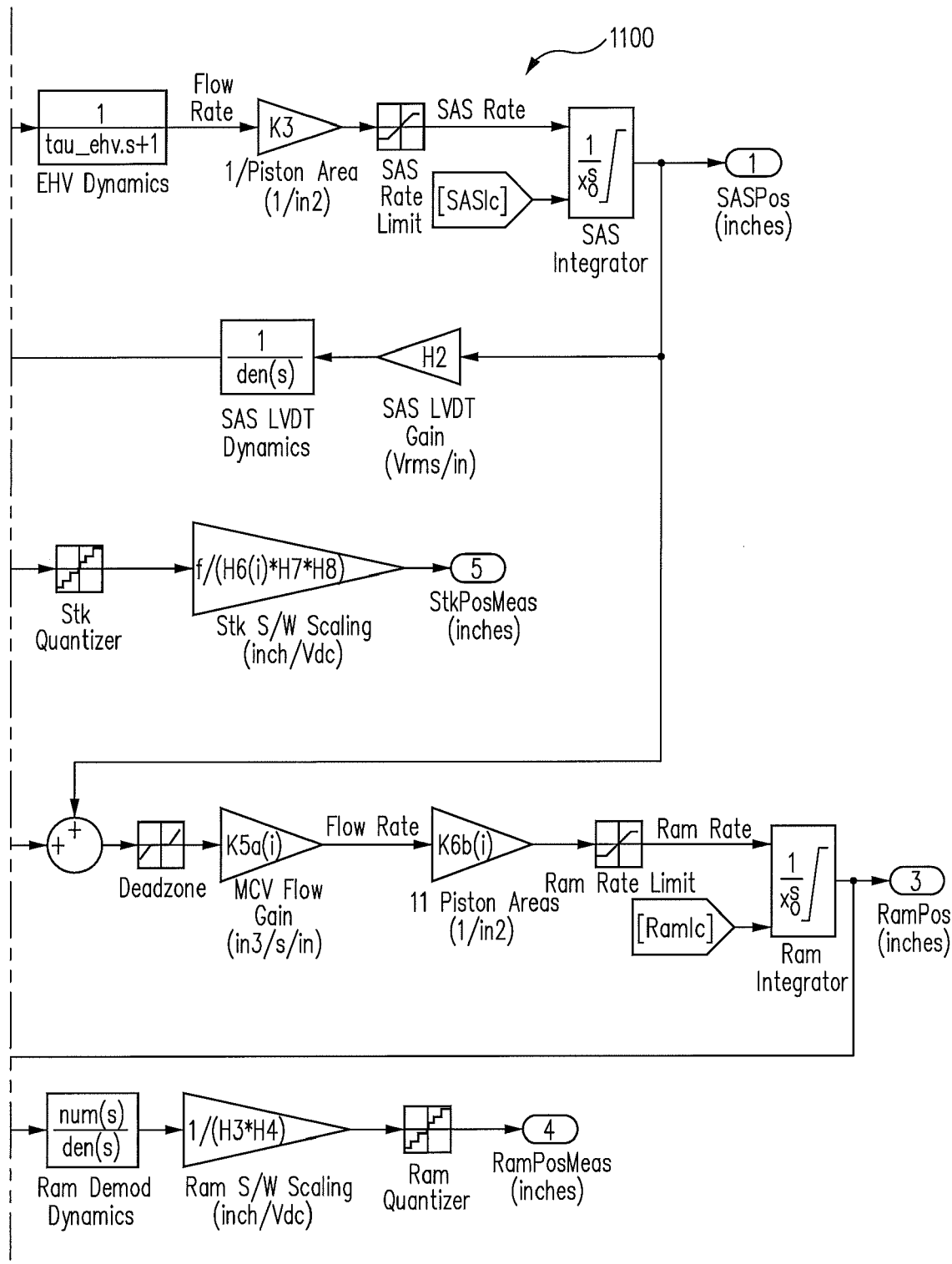

As a practical matter, the actuation system 1000 has tolerance variations in each of its parameters. These variations can be as a result of, for example, actuator manufacturing processes or the particular environment to which they are subjected. As discussed above, these tolerances are used to form the fast and slow (i.e., high and low) bounding models of the system. For purposes of illustration, FIG. 11 is a functional block diagram of a model 1100 of the same actuator as modeled in FIG. 10, but which includes substantially more detail in which each of the above variable parameter tolerances is taken into account.

EXAMPLE 1

Helicopter Full Authority FBW Flight Control System Actuation Monitoring System System Overview The first example for which an embodiment of an actuation monitoring system in accordance with the present disclosure is developed is that of a control architecture providing full authority fly-by-wire (FBW) capability in the helicopter example above. Indeed, in this particular example, successful implementation of the control architecture, which provides full FBW with a minimum of changes to an existing flight control system, is dependent upon incorporation of the monitoring system of the present disclosure therein. As above, the control architecture uses an existing, single-channel, fly-by-wire "BUCS" system as its primary flight control system. Failure of the FBW flight control system thus results in a reversion to the aircraft's mechanical flight control system. The resulting design is thus very efficient, in that it starts with an existing flight control system, and with very few modifications, transforms it into a FBW system. The exemplary actuation monitoring system incorporates three major elements: 1) robust, extremely reliable methods for detecting failures while in the FBW mode; 2) a very reliable method of switching from electrical control to mechanical control; and, 3) reliable monitoring of the reversionary mechanical system's integrity while in the FBW mode. The actuation monitoring system of the present disclosure addresses the first of these elements.

Monitoring System

Figure 12:
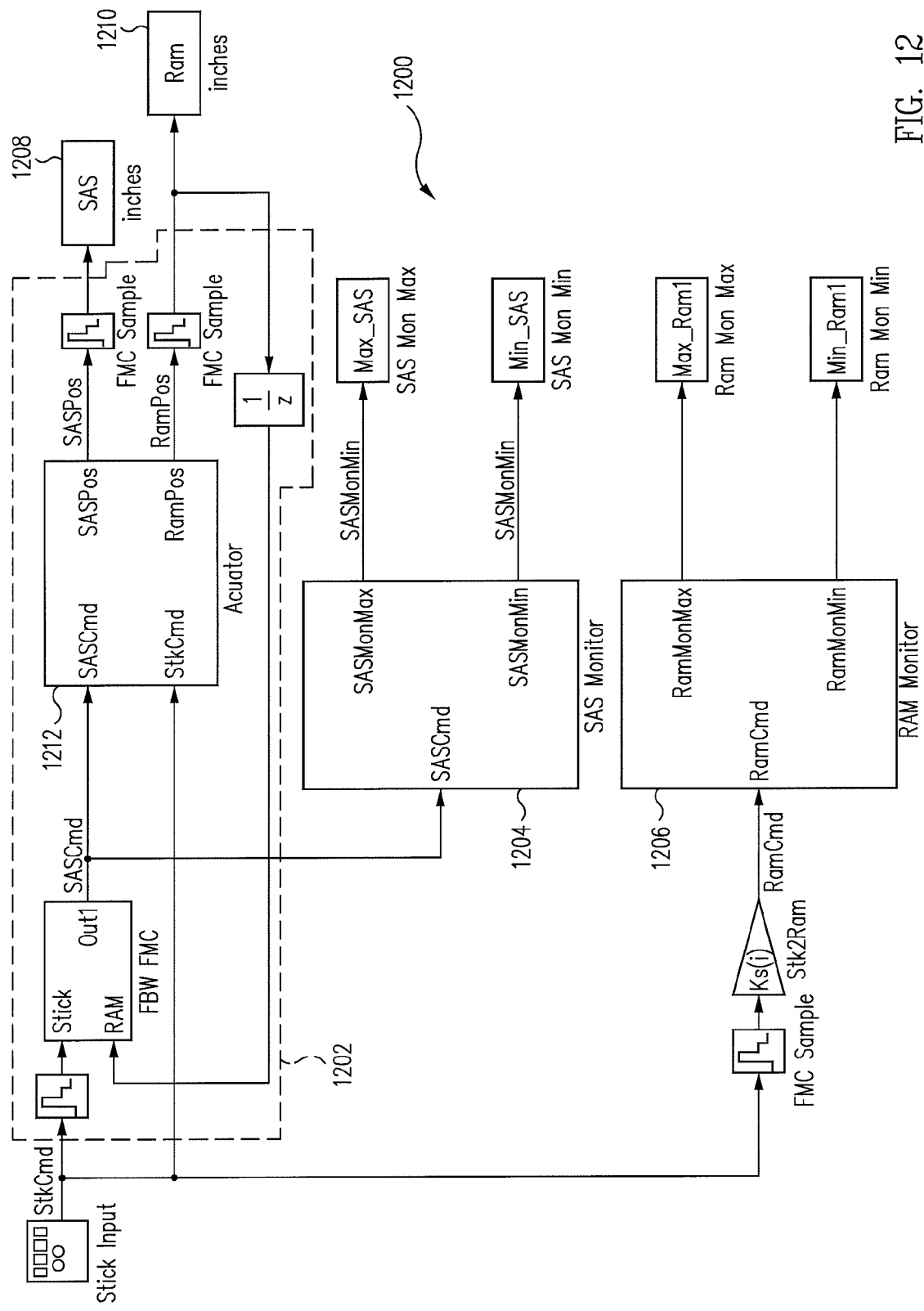
FIG. 12 is a functional block diagram of an exemplary embodiment of an actuation monitoring system in accordance with the present disclosure, as implemented in a full authority FBW control system of a helicopter.

FIG. 12 is a functional block diagram of an exemplary actuation monitoring system 1200 working in conjunction with the foregoing, full-authority FBW system 1202. As illustrated in FIG. 12, the SAS actuation monitor 1204 monitors the SAS subsystem, which is a simple SISO, first-order system. The ram actuation monitor 1206 monitors a second-order SISO system, of which the first part is the SAS subsystem itself. These two exemplary monitors are described in more detail below.

In order to detect actuation failures while the control system 1202 is operating in the FBW mode, the fault monitoring system 1200 monitors both the SAS and the ram positions 1208 and 1210 of the actuator, respectively. Without such monitoring, and in a subsequent reversion to mechanical control, an electrical control failure of the SAS 1210 or ram 1210 may be undesirable. The actuator model 1212 used for the FBW mode of operation is illustrated in FIG. 10, with $K_1=0$ (i.e., spool locked). In accordance with the exemplary embodiment developed here, the actuator model 1212 can be thought of as comprising two subsystems, viz., an "SAS subsystem" and a "ram subsystem." Thus, two separate monitors, viz., an SAS monitor 1204 and a ram monitor 1206, are required in each of the two modes.

The SAS Monitor

Figure 13:
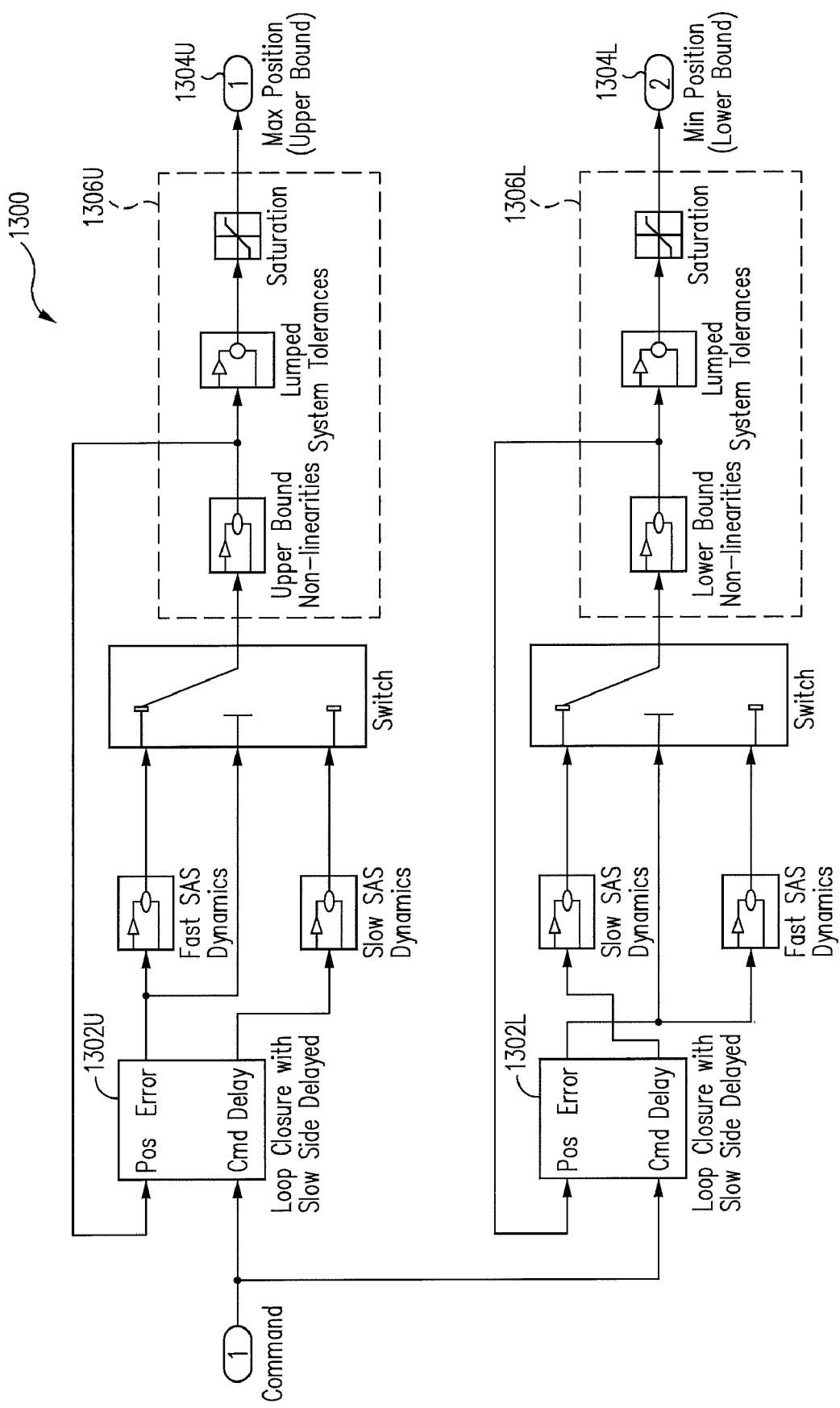
FIG. 13 is a functional block diagram of an exemplary embodiment of a Stability Augmentation system (SAS) actuation monitor of the exemplary monitoring system of FIG. 12.

The SAS monitor 1204 of the exemplary embodiment of FIG. 12 comprises a single-stage, first-order monitor. Thus, employing the monitoring system 400 described above in conjunction with FIG. 4, as applied to a first order monitoring scheme, results in the actuation monitoring system 1300 illustrated in the functional block diagram of FIG. 13. As may be seen by a comparison to the monitoring system 400 of FIG. 4, the SAS monitoring system 1300 is very similar to that of FIG. 4, but with the addition of the two-sample delay of the slow side of the SAS dynamics discussed above incorporated into the respective loop closures of the upper and lower bounds of the monitoring envelope. The upper and lower actuator dynamic limits provide the limits for the monitoring dynamics, while the saturation non-linearity models provide the rate limits corresponding to the dynamics limits.

The Ram Monitor

Figure 14A:
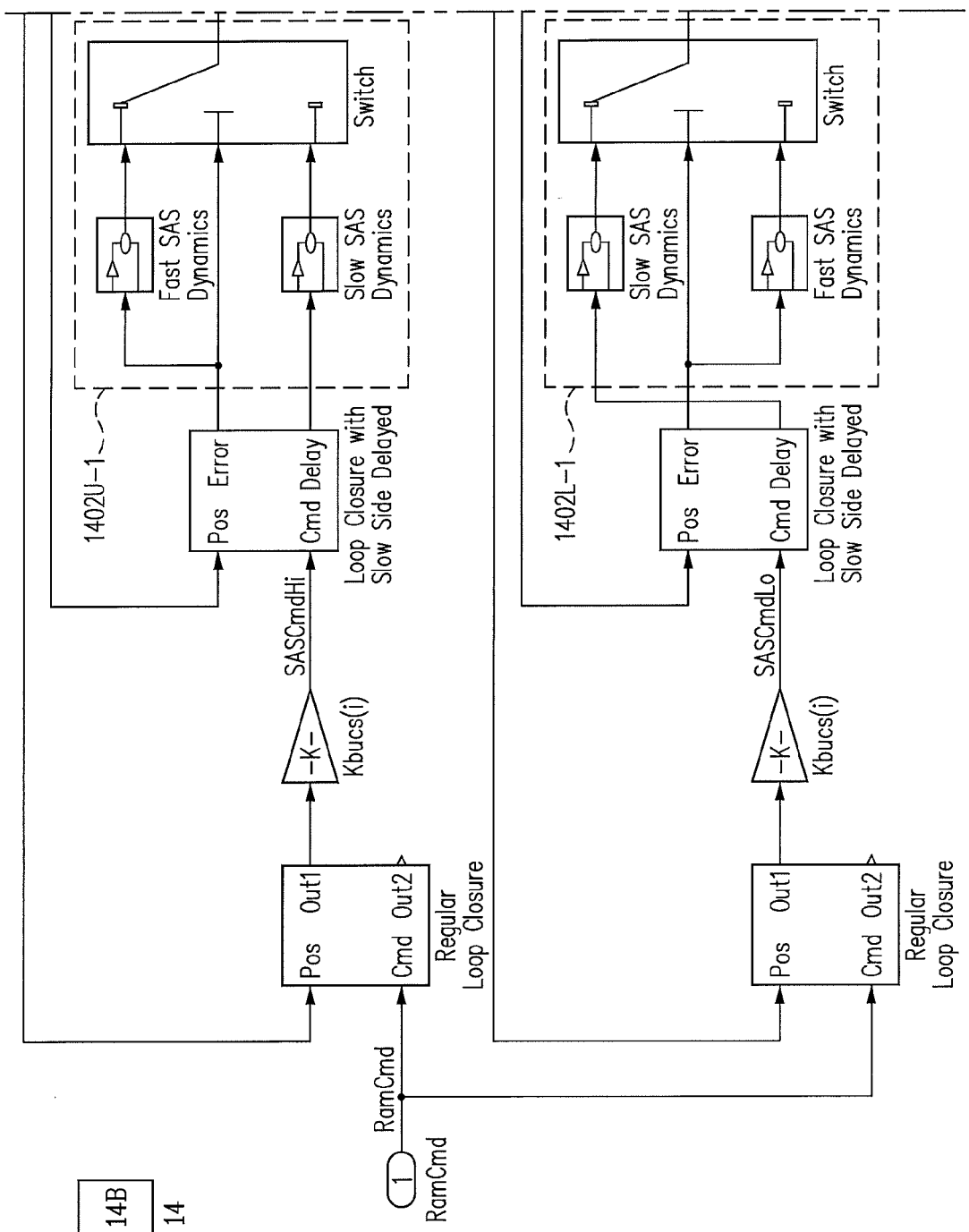
FIG. 14 is a functional block diagram of an exemplary embodiment of a ram actuation monitor of the exemplary monitoring system of FIG. 12.
Figure 14B:
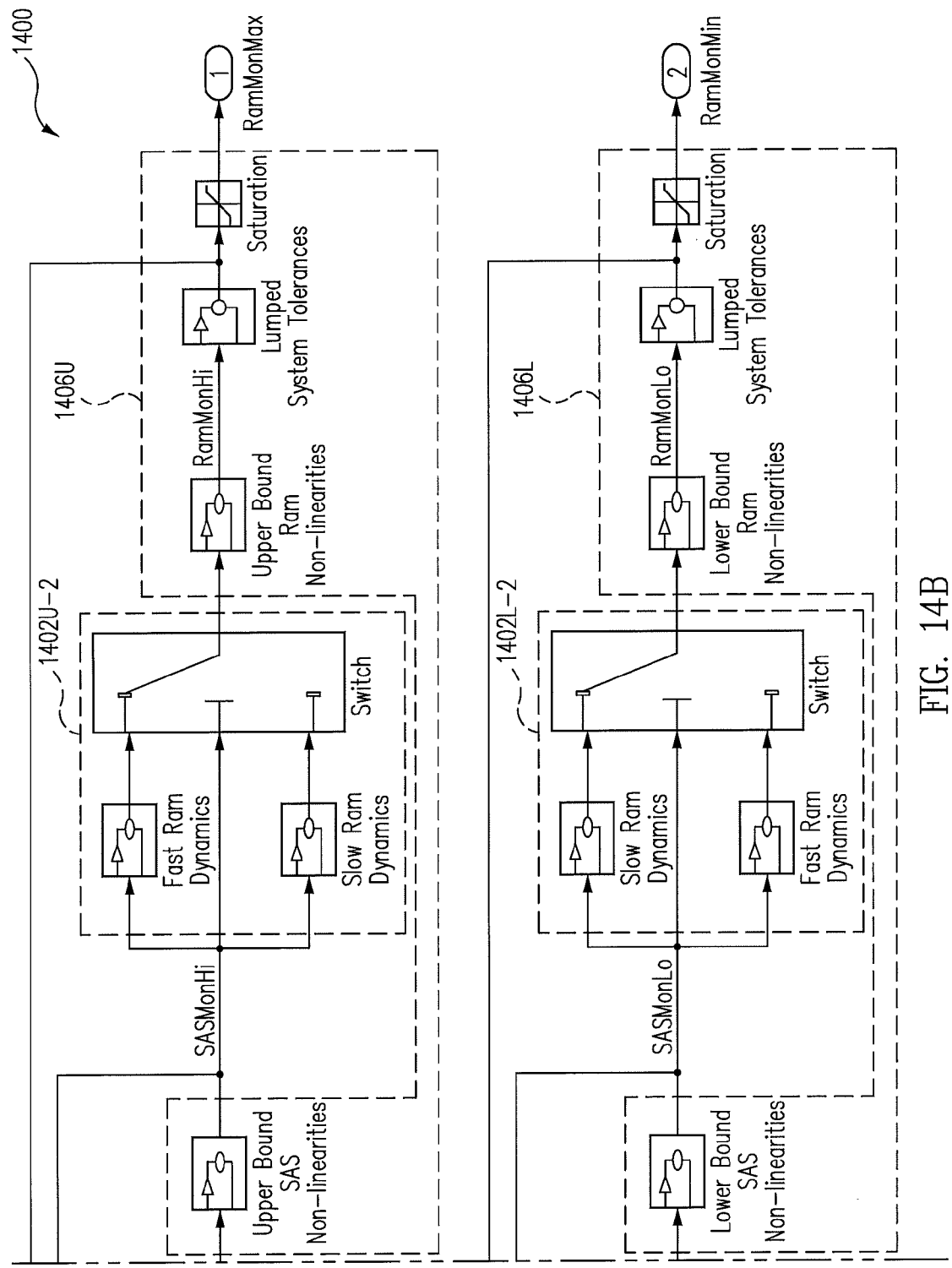

The ram monitor 1206 of the exemplary embodiment of FIG. 12 comprises a single-stage, second-order SISO monitor. Thus, employing the monitoring system 400 described above in conjunction with FIG. 4, as applied to a two stage monitoring scheme, results in the monitoring system model 1400 illustrated in FIG. 14. The two sets of upper and lower actuator dynamic limits provide the limits for the monitoring dynamics, while the saturation and non-linearity models provide the rate limits corresponding to the dynamics limits.

EXAMPLE 2

Partial Authority Flight Control System Actuator Monitoring System

System Overview

The second example for which an exemplary actuation monitoring system in accordance with the present disclosure is developed is that of a control architecture for providing an increased partial authority system for the helicopter described above. The second exemplary monitoring system is similar to that for the full authority FBW control system described above, except that there is a direct mechanical input (i.e., the control stick) into the ram model, and the authority of the SAS on the ram is limited to +20 to −20%.

Monitoring System

Figure 15:
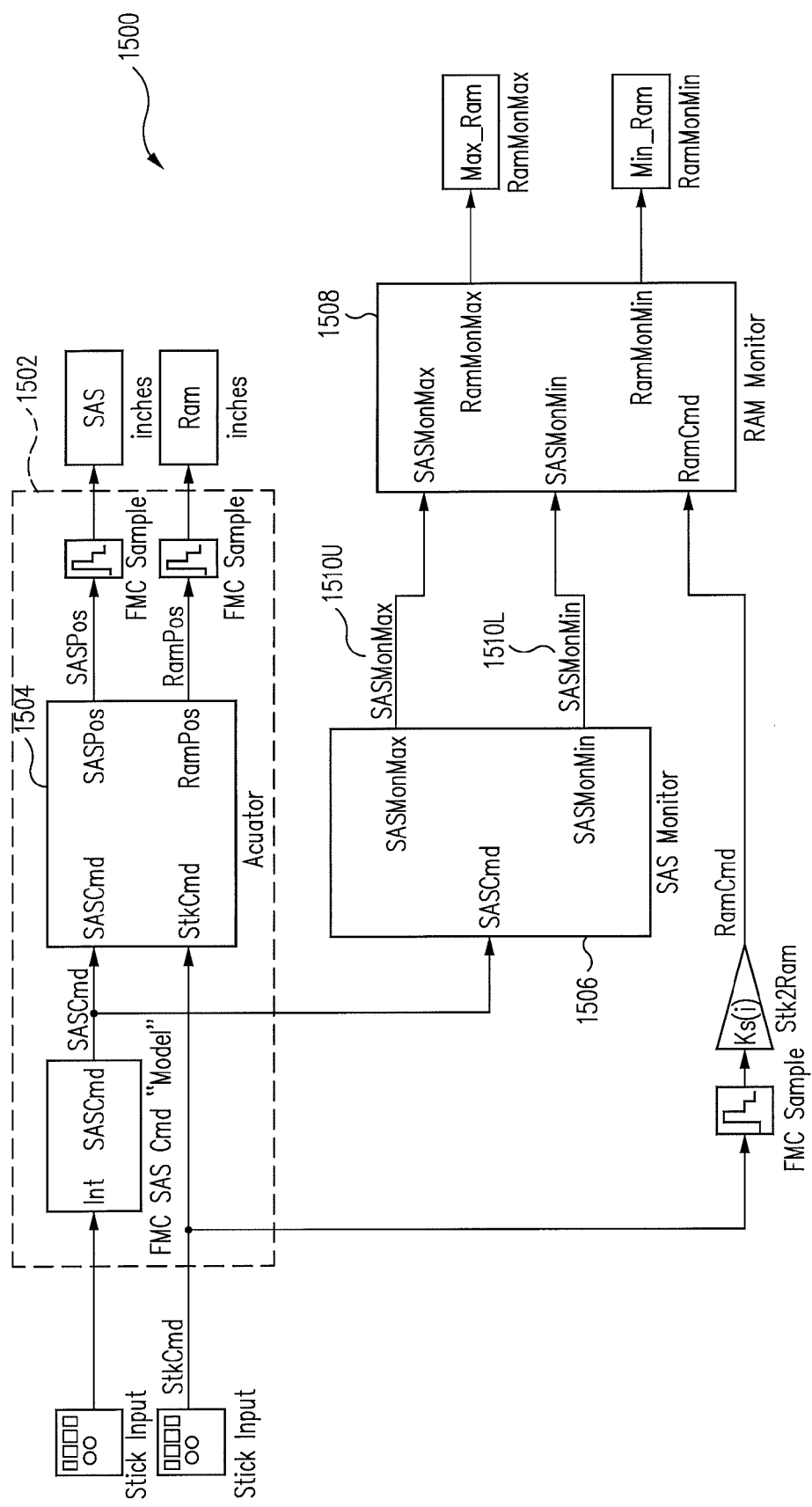
FIG. 15 is a functional block diagram of an exemplary embodiment of an actuation monitoring system in accordance with the present disclosure, as implemented in a partial authority control system of a helicopter.

FIG. 15 is a functional block diagram of an exemplary actuation monitoring system model 1500 implemented in the second example system described above, i.e., the partial authority system 1502. The actuator model 1504 for this flight control system may be substantially the same as that described above and illustrated in FIG. 10. In order to detect actuation failures in the control system 1502, the exemplary monitoring system 1500 monitors both the actuator's ram and SAS positions. Without such monitoring, and with a subsequent disengagement of the partial authority system, an electrical control failure of the SAS or ram could cause large, undesirable changes in the aircraft states, depending on the specific flight conditions.

In accordance with the monitoring system framework developed herein, the actuator model 1504 can be thought of as consisting of two subsystems, viz., a SAS subsystem and a ram subsystem (see FIG. 10). Thus, a separate actuation fault monitoring system, viz., an SAS monitoring system 1506 and a ram monitoring system 1508, is required for each of the two systems.

The SAS actuation monitoring system 1506 may be substantially identical to that employed for the full authority system example described above and illustrated in FIG. 13. However, the ram monitoring system 1508 is somewhat different in this example. This is because, in the full authority control system described above, the monitored system was a second order, SISO system, whereas, in this control system 1502, the ram subsystem is a single-stage, multiple-input, single output (MISO) system, with two parallel inputs, viz., one from the SAS control and the other from the control stick. Additionally, as illustrated in FIG. 15, the max and min 1510U and 1510L of the envelope of the SAS monitor are used as inputs to the ram monitor 1508.

Figure 16:
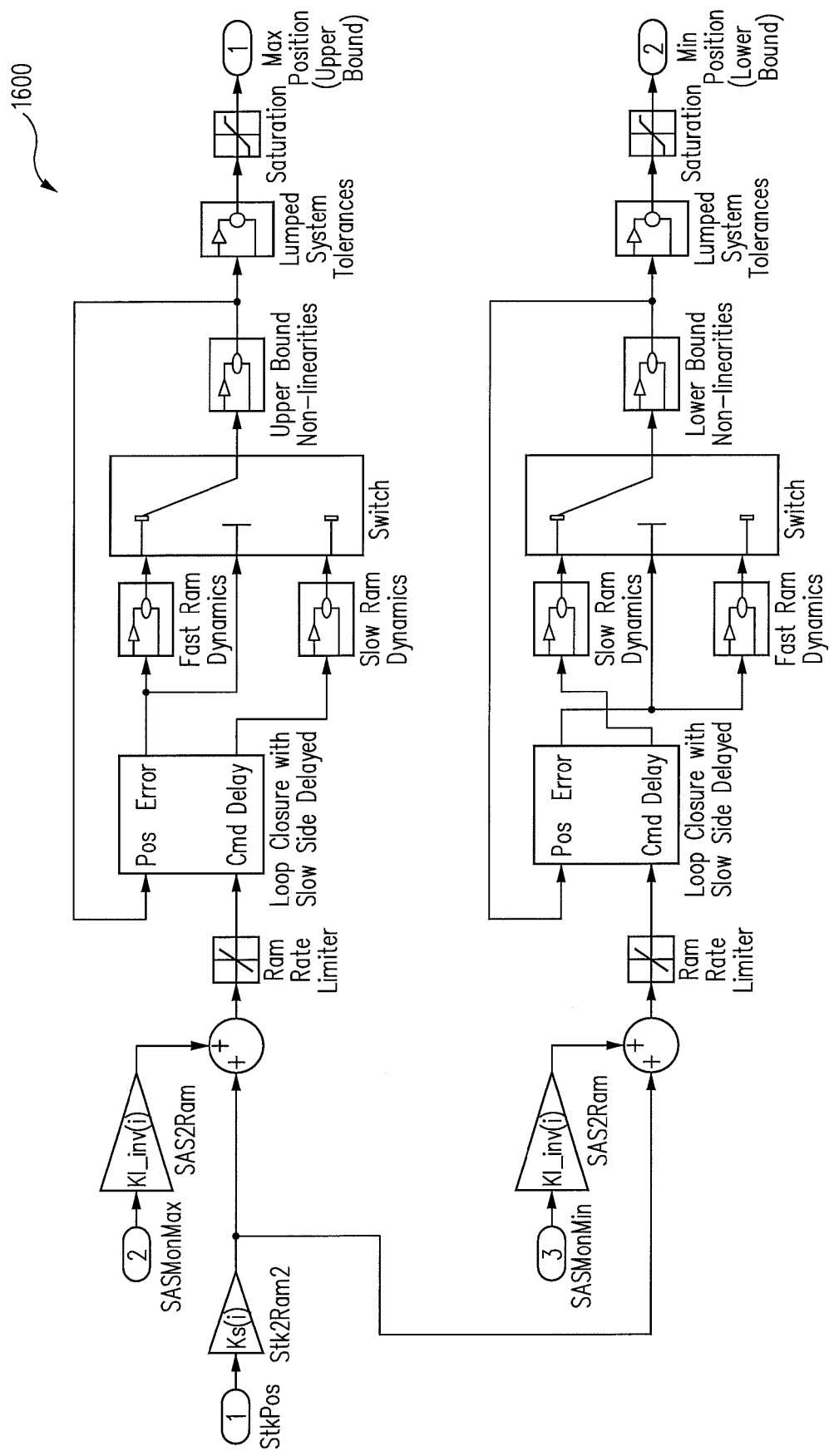
FIG. 16 is a functional block diagram of an exemplary embodiment of a ram actuation monitor of the exemplary actuation monitoring system of FIG. 15.

FIG. 16 is a functional block diagram, or model, of an exemplary embodiment of the ram actuation monitoring system 1508 of the monitoring system 1500 of FIG. 15. As may be seen by reference to FIGS. 14 and 16, the respective ram monitoring systems 1400 and 1600 are similar in many respects, and differ primarily in the modifications needed in the latter to accommodate the multiple inputs from the SAS monitor 1506.

In accordance with the present disclosure, novel control system actuation integrity and fault monitoring systems create a dynamic, asymmetric "monitoring envelope" that accounts for the permissible variation in dynamics, non-linearities and tolerances of the monitored system. A failure of the system is indicated when the monitored signals exceed the boundaries of that envelope. The accounting for dynamics and non-linearities based on permissible variations thereof makes the systems very robust, enabling quicker and more reliable detection of actuation failures. This capability is critical for control systems in which timely shutoff is crucial.

The actuation monitoring systems of the present disclosure have been described and illustrated herein in the context of two different helicopter flight control systems, in which they have been shown to provide quick, reliable detection of actuation failures, allowing for automatic switchover to backup systems before undesirable results occur. As such, the monitoring systems of the present disclosure can provide an essential element in many aircraft flight control systems. However, as will be evident to those of skill in this art, they are not limited to flight control systems, but are equally applicable to the control of any dynamic system.

Figure 17:
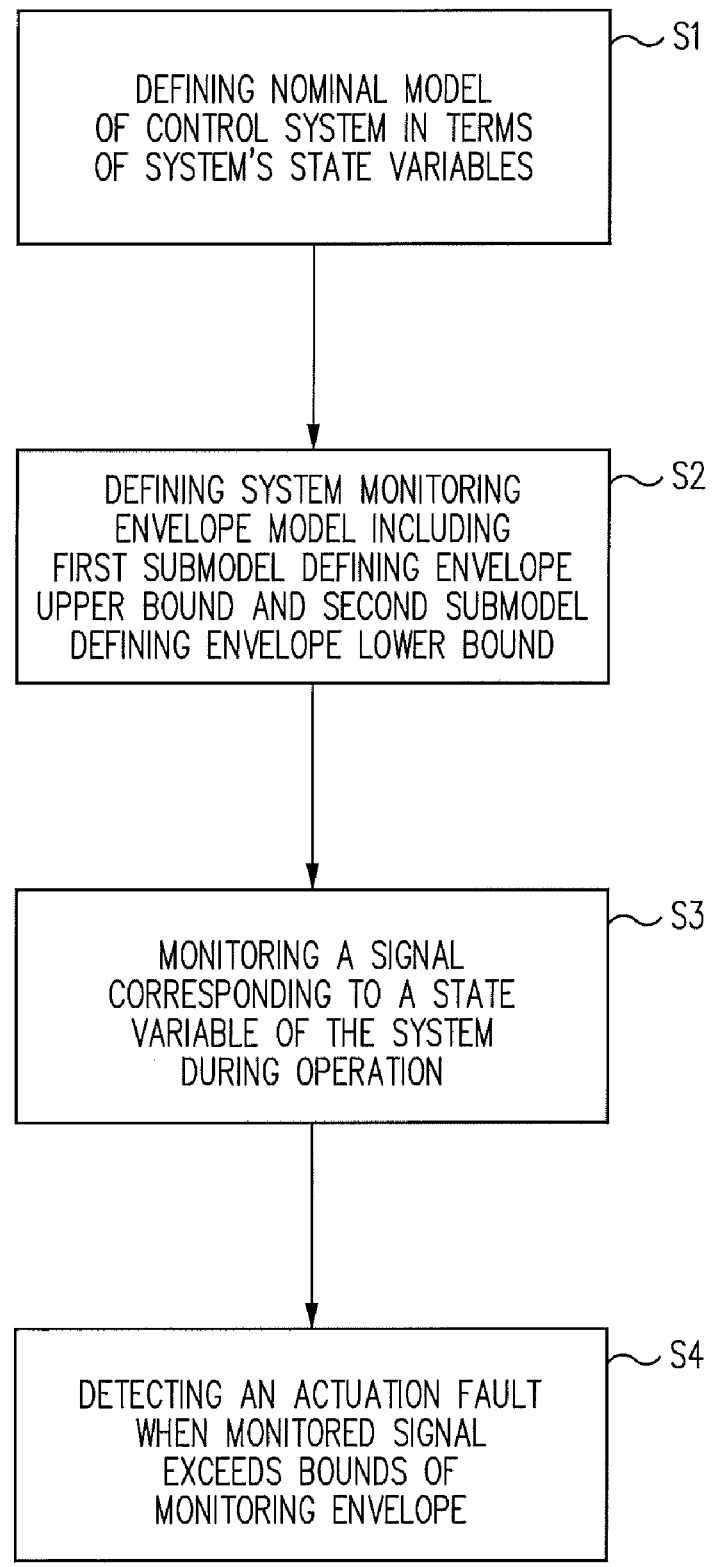
FIG. 17 is a functional block diagram of a method for monitoring and detecting failures in the actuation of a control system in accordance with the present disclosure.

An exemplary method for monitoring and detecting failures in the actuation of a control system is illustrated in the functional block diagram of FIG. 17. As shown in FIG. 17, the method begins at S1 with defining a nominal model of the control system in terms of the state variables of the system. In one embodiment of the method, defining the monitoring envelope comprises accounting for the dynamics and non-linearities of each element of the control system and the respective variations therein during system operation.

At S2, a model of an asymmetric actuation monitoring envelope is defined that dynamically bounds a range that measured state variables of the system are allowed to take during operation of the system as a function of the nominal system state model defined at S1. In one embodiment, the definition of the monitoring envelope comprises defining an upper bound of the monitoring envelope with a first subsystem of the monitoring envelope model, and defining a lower bound of the monitoring envelope with a second subsystem of the monitoring envelope model.

In another embodiment, each subsystem of the monitoring envelope model defined comprises a closed loop feedback system, including a system loop closure, a fast system dynamics model, a slow system dynamics model, a switch, a system non-linearity model, a system lumped tolerances model and a signal saturation model. In this embodiment, the respective switches are used to select between the respective fast and slow system dynamics models of the subsystems so as to define the maximum permissible monitoring envelope upper and lower bounds as a function of variations in the respective system dynamics and non-linearity models of each subsystem during system operation.

At S3, a signal corresponding to a state variable of the system is monitored during its operation, and, at S4, a failure in the actuation of the control system is detected when the monitored signal exceeds the bounds of the monitoring envelope.

Figure 18:
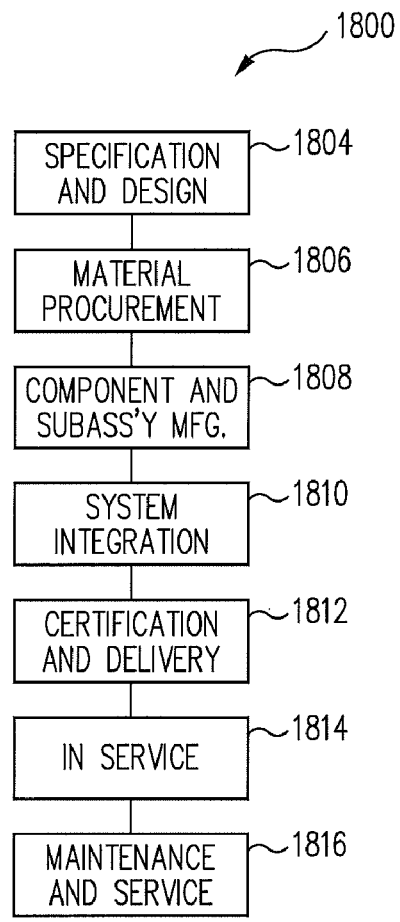
FIG. 18 is a flow diagram of aircraft production and service methodology.
Figure 19:
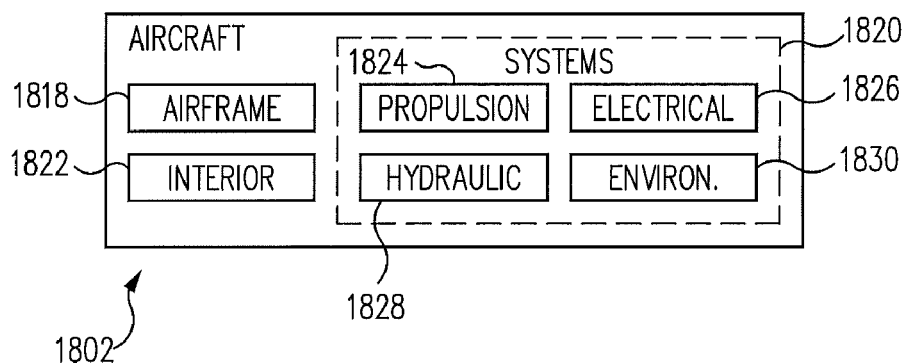
FIG. 19 is a block diagram of an aircraft.

Referring more particularly to the drawings, embodiments of the disclosure may be described in the context of an aircraft manufacturing and service method 1800 as shown in FIG. 18 and an aircraft 1802 as shown in FIG. 19. During pre-production, exemplary method 1800 may include specification and design 1804 of the aircraft 1802 and material procurement 1806. During production, component and subassembly manufacturing 1808 and system integration 1810 of the aircraft 1802 takes place. Thereafter, the aircraft 1802 may go through certification and delivery 1812 in order to be placed in service 1814. While in service by a customer, the aircraft 1802 is scheduled for routine maintenance and service 1816 (which may also include modification, reconfiguration, refurbishment, and so on).

Each of the processes of method 1800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 19, the aircraft 1802 produced by exemplary method 1800 may include an airframe 1818 with a plurality of systems 1820 and an interior 1822. Examples of high-level systems 1820 include one or more of a propulsion system 1824, an electrical system 1826, a hydraulic system 1828, and an environmental system 1830. Any number of other systems may be included. Although an aerospace example is shown, the principles of the invention may be applied to other industries, such as the automotive industry.

Apparatus and methods embodied herein may be employed during any one or more of the stages of the production and service method 1800. For example, components or subassemblies corresponding to production process 1808 may be fabricated or manufactured in a manner similar to components or subassemblies produced while the aircraft 1802 is in service. Also, one or more apparatus embodiments, method embodiments, or a combination thereof may be utilized during the production stages 1808 and 1810, for example, by substantially expediting assembly of or reducing the cost of an aircraft 1802. Similarly, one or more of apparatus embodiments, method embodiments, or a combination thereof may be utilized while the aircraft 1802 is in service, for example and without limitation, to maintenance and service 1816.

As those of skill in this art will appreciate, many modifications, substitutions and variations can be made in the applications and methods of implementation of the control system actuation failure monitoring systems of the present disclosure without departing from its spirit and scope. In light of this, the scope of the present disclosure should not be limited to that of the particular embodiments illustrated and described herein, as they are only by way of some examples thereof, but instead, should be fully commensurate with that of the claims appended hereafter and their functional equivalents.

What is claimed is:

1. A method for monitoring and detecting failures in the actuation of a control system, the method comprising:
defining a nominal model of the control system in terms of the state variables of the control system;
defining a model of an asymmetric actuation monitoring envelope that dynamically bounds a range that measured state variables of the system are allowed to take during operation of the system as a function of the nominal system state model, the monitoring envelope including a first subsystem defining an upper bound of the monitoring envelope and a second subsystem defining a lower bound of the monitoring envelope, each subsystem comprising a closed loop feedback system including a system loop closure, a fast system dynamics model, a slow system dynamics model, a switch, a system non-linearity model, a system lumped tolerances model and a signal saturation model;

and using a processor:

selecting between the respective fast and slow system dynamics models of the subsystems with the respective switches thereof so as to define the maximum permissible monitoring envelope upper and lower bounds as a function of variations in the respective system dynamics and non-linearity models of each subsystem during system operation;

monitoring a signal corresponding to a state variable of the system during operation thereof; and, detecting a failure in the actuation of the control system when the monitored signal exceeds the bounds of the monitoring envelope.

2. The method of claim 1, wherein defining the monitoring envelope comprises accounting for the dynamics and non-linearities of each element of the control system and the respective variations therein during system operation.

3. The method of claim 1, further comprising using a processor to delay a signal input to the respective slow systems dynamic model of each submodule by at least two signal sample periods.

4. The method of claim 1, further comprising using a processor to delay a declaration of a failure in the actuation of the control system for a period of time, the magnitude of the delay being a function of the magnitude of the amount by which the monitored signal exceeds the bounds of the monitoring envelope.

5. The method of claim 1, wherein the control system comprises a plurality of stages, and further comprising defining a respective actuation monitoring envelope model for each of the stages of the system.

6. The method of claim 1, wherein all of the elements of the monitoring envelope are implemented in discrete-time, and further comprising converting continuous time element parameters to discrete time element parameters.

7. Apparatus for monitoring and detecting failures in the actuation of a control system, the apparatus comprising:

a nominal model of the control system defined in terms of the state variables of the control system;

a model of an asymmetric actuation monitoring envelope that dynamically bounds a range that measured state variables of the system are allowed to take during operation of the system defined as a function of the nominal system state model, the monitoring envelope including a first subsystem defining an upper bound of the monitoring envelope and a second subsystem defining a lower bound of the monitoring envelope, each subsystem comprising a closed loop feedback system including a system loop closure, a fast system dynamics model, a slow system dynamics model, a switch, a system nonlinearity model, a system lumped tolerances model and a signal saturation model;

means for selecting between the respective fast and slow system dynamics models of the subsystems with the respective switches thereof so as to define the maximum permissible monitoring envelope upper and lower bounds as a function of variations in the respective system dynamics and non-linearity models of each subsystem during system operation;

means for monitoring a signal corresponding to a state variable of the system during operation thereof; and, means for detecting a failure in the actuation of the control system when the monitored signal exceeds the bounds of the monitoring envelope.

8. The monitoring apparatus of claim 7, wherein the monitoring envelope accounts for the dynamics and non-linearities of each element of the control system and the respective variations therein during system operation.

9. The monitoring apparatus of claim 7, further comprising means in each of the respective system loop closures of each subsystem for delaying a signal input to the respective slow systems dynamic model thereof by at least two signal sample periods.

10. The monitoring apparatus of claim 7, further comprising means for delaying a declaration of a failure in the actuation of the control system for a period of time, the magnitude of the delay being a function of the magnitude of the amount by which the monitored signal exceeds the bounds of the monitoring envelope.

11. The monitoring apparatus of claim 7, wherein the control system comprises a plurality of stages, and further comprising a respective actuation monitoring envelope model defined for each of the stages of the system.

12. The monitoring apparatus of claim 7, wherein all of the elements of the monitoring envelope are implemented in discrete-time, and further comprising means converting continuous time element parameters to discrete time element parameters.

13. The monitoring apparatus of claim 7, wherein the respective loop closures of each subsystem comprises a controller.

14. The apparatus of claim 7, wherein the monitored control system comprises a flight control system of an aircraft.

15. The apparatus of claim 14, further comprising means for switching the control of the aircraft to a backup system upon the detection of an actuation failure.

16. The apparatus of claim 14, wherein the flight control system comprises a fly-by-wire (FBW) control system with a mechanical backup or a mechanical control system with a partial authority electrical control system.

17. A method for monitoring and detecting failures in the actuation of an aircraft control system, the method comprising:

defining a nominal model of the control system in terms of the state variables thereof;

defining a model of an asymmetric actuation monitoring envelope that accounts for the dynamics and non-linearities of each element of the control system and the respective variations occurring therein during system operation, and that dynamically bounds a range that measured state variables of the system are allowed to take during operation of the system as a function of the nominal system state model, the monitoring envelope comprising first and second envelope subsystem models respectively defining upper and lower bounds of the monitoring envelope, each subsystem model comprising a closed loop feedback system, including a system loop closure, a fast system dynamics model, a slow system dynamics model, a switch, a system non-linearity model, a system lumped tolerances model and a signal saturation model;

and using a processor:

selecting between the respective fast and slow system dynamics models of the subsystems with the respective switches thereof so as to define the maximum permissible monitoring envelope upper and lower bounds as a function of variations in the respective system dynamics and non-linearity models of each subsystem during system operation;

delaying a signal input to the respective slow systems dynamic model of each sub-module by at least two signal sample periods;

monitoring a signal corresponding to a state variable of the system during operation thereof; and, detecting a failure in the actuation of the control system when the monitored signal exceeds the bounds of the monitoring envelope.

18. The method of claim 17, wherein the aircraft control system comprises a plurality of stages, and further comprising defining a respective actuation monitoring envelope model for each of the stages of the system.

19. Apparatus for monitoring and detecting failures in the actuation of an aircraft control system, the apparatus comprising:

a nominal model of the control system defined in terms of the state variables thereof;

a model of an asymmetric actuation monitoring envelope that accounts for the dynamics and non-linearities of each element of the control system and the respective variations therein during system operation and that dynamically bounds a range that measured state variables of the system are allowed to take during operation of the system defined as a function of the nominal system state model, the monitoring envelope comprising first and second envelope subsystem models respectively defining upper and lower bounds of the monitoring envelope, each subsystem model comprising a closed loop feedback system, including a system loop closure, a fast system dynamics model, a slow system dynamics model, a switch, a system non-linearity model, a system lumped tolerances model and a signal saturation model;

means for selecting between the respective fast and slow system dynamics models of the subsystems with the respective switches thereof so as to define the maximum permissible monitoring envelope upper and lower bounds as a function of variations in the respective system dynamics and non-linearity models of each subsystem during system operation;

means in each of the respective system loop closures of each subsystem for delaying a signal input to the respective slow systems dynamic model thereof by at least two signal sample periods.

means for monitoring a signal corresponding to a state variable of the system during operation thereof; and, means for detecting a failure in the actuation of the control system when the monitored signal exceeds the bounds of the monitoring envelope.

20. The monitoring apparatus of claim 19, further comprising means for delaying a declaration of a failure in the actuation of the control system for a period of time, the magnitude of the delay being a function of the magnitude of the amount by which the monitored signal exceeds the bounds of the monitoring envelope.

* * * * *